US012780628B2

(12) United States Patent
Kawashima

(10) Patent No.: US 12,780,628 B2
(45) Date of Patent: Nov. 3, 2026

(54) CONVEYANCE DEVICE

(71) Applicant: DAIFUKU CO., LTD., Osaka (JP)

(72) Inventor: Tomohiko Kawashima, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 266 days.

(21) Appl. No.: 18/673,391

(22) Filed: May 24, 2024

(65) Prior Publication Data

US 2024/0400358 A1 Dec. 5, 2024

(30) Foreign Application Priority Data

May 30, 2023 (JP) ................................ 2023-088708

(51) Int. Cl.
*B66F 9/07* (2006.01)
*B65G 1/04* (2006.01)

(52) U.S. Cl.
CPC ............ *B66F 9/072* (2013.01); *B65G 1/0407* (2013.01)

(58) Field of Classification Search
CPC ........... F16N 11/00; B66F 7/28; B65G 1/0407
See application file for complete search history.

(56) References Cited

U.S. PATENT DOCUMENTS 2,648,401 A * 8/1953 Frischmann .............. B66F 9/08 187/226
2009/0057066 A1* 3/2009 Fukuda ..................... B66F 9/07 187/244
2015/0225220 A1 8/2015 Koyama
2019/0257409 A1 8/2019 Bourgault et al.
2021/0095718 A1 4/2021 Tseng et al.
2021/0309457 A1* 10/2021 Tsuji .................... B65G 1/0421

FOREIGN PATENT DOCUMENTS

| | | | |
|---|---|---|---|
| CN | 112594283 | A | 4/2021 |
| JP | 54-142780 | U | 10/1979 |
| JP | 2010-150004 | A | 7/2010 |
| JP | 5983752 | B2 | 9/2016 |
| JP | 2017-187091 | A | 10/2017 |
| JP | 2022-156402 | A | 10/2022 |
| WO | 00/29160 | A1 | 5/2000 |

OTHER PUBLICATIONS

Office Action dated Dec. 16, 2025 issued in Japanese patent application No. 2023-088708.

* cited by examiner

*Primary Examiner* — Saul Rodriguez
*Assistant Examiner* — Juan S Moscoso
(74) *Attorney, Agent, or Firm* — Harness, Dickey & Pierce, P.L.C.

(57) ABSTRACT

Achieved is a conveyance device that enables grease to be easily injected into a linear guide block. A conveyance device includes: a support pillar; and an elevator section which is able to be loaded with a conveyance target and which is configured to be raised and lowered along the support pillar, the support pillar being provided with a linear guide rail, the elevator section being provided with: a linear guide block which engages with the linear guide rail such that the linear guide block is linearly movable; and an injection section that enables grease which is to be supplied to the linear guide block to be injected from a position spaced from the linear guide block.

15 Claims, 5 Drawing Sheets

CONVEYANCE DEVICE

This Nonprovisional application claims priority under 35 U.S.C. § 119 on Patent Application No. 2023-088708 filed in Japan on May 30, 2023, the entire contents of which are hereby incorporated by reference.

TECHNICAL FIELD

The present invention relates to a conveyance device.

BACKGROUND ART

Conventionally, conveyance devices have been known which are configured to convey articles with the articles loaded to elevator sections configured to be raised and lowered along masts (support pillars), as disclosed in, for example, Patent Literature 1.

CITATION LIST

Patent Literature

[Patent Literature 1]
Japanese Patent No. 5983752

SUMMARY OF INVENTION

Technical Problem

In such a conveyance device, in order to enable the elevator section to be smoothly raised and lowered along the masts, linear guide rails are provided to the masts, and the elevator section is provided with linear guide blocks which engage with the linear guide rails such that the linear guide blocks are linearly movable. The linear guide blocks necessitate maintenance of injecting grease as appropriate so as not to run out of grease.

However, in such a conveyance device installed in, for example, a factory or a warehouse, it is not always easy to access the linear guide blocks for injecting grease, and it is demanded to improve ease of maintenance.

It is an object of an aspect of the present invention to achieve a conveyance device that enables grease to be easily injected into a linear guide block.

Solution to Problem

In order to solve the foregoing problem, a conveyance device in accordance with an aspect of the present invention includes a support pillar; and an elevator section which is able to be loaded with a conveyance target and which is configured to be raised and lowered along the support pillar, the support pillar being provided with a linear guide rail, the elevator section being provided with: a linear guide block which engages with the linear guide rail such that the linear guide block is linearly movable; and an injection section that enables grease which is to be supplied to the linear guide block to be injected from a position spaced from the linear guide block.

Advantageous Effects of Invention

According to an aspect of the present invention, it is possible to achieve a conveyance device that enables grease to be easily injected into a linear guide block.

DESCRIPTION OF EMBODIMENTS

Embodiment

Figure 1:
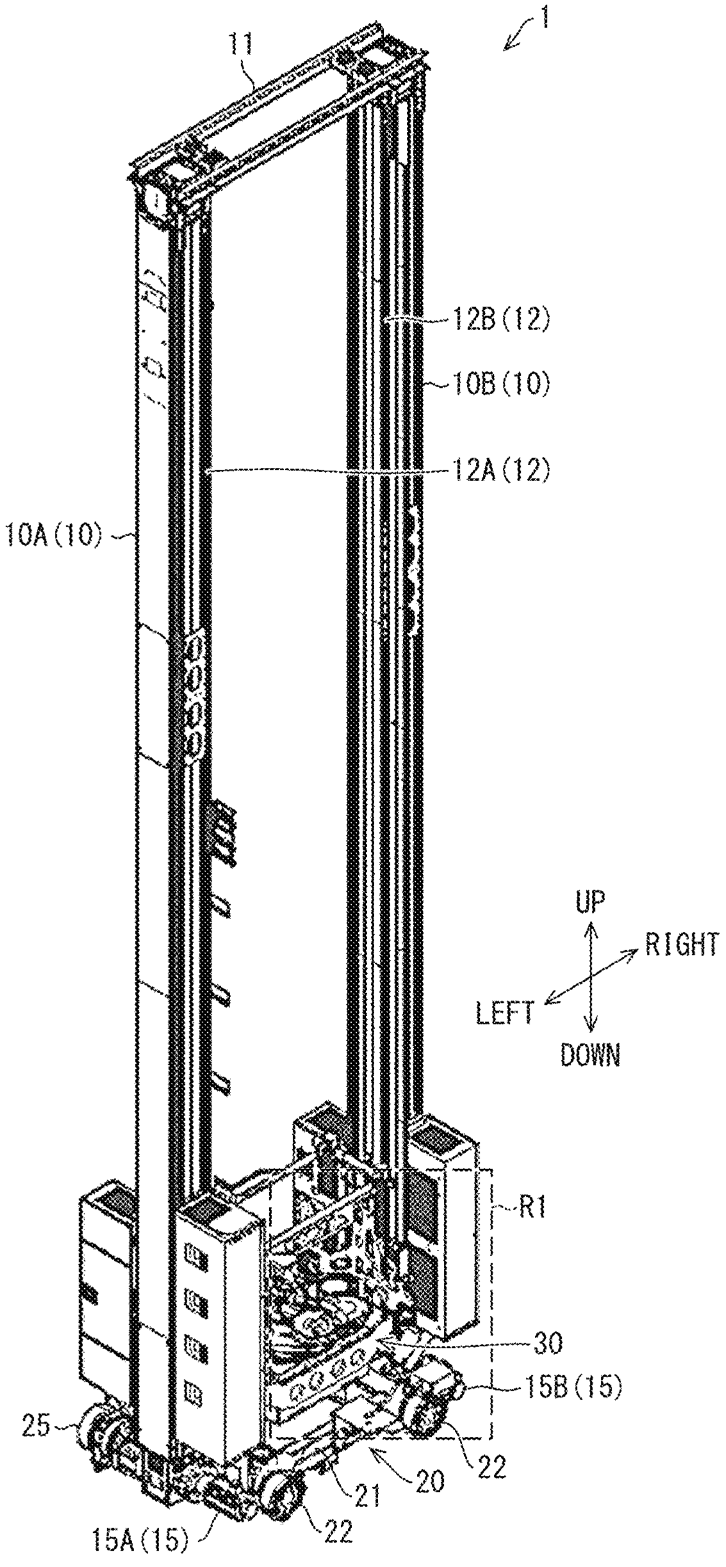
FIG. 1 is a perspective view illustrating a conveyance device in accordance with an embodiment of the present invention.

The following description will discuss an embodiment of the present invention in detail. Note, however, that the following description discusses one example of a conveyance device 1 in accordance with the present invention, and technical scope of the present invention is not limited to examples in the drawings. For simplification of description, the following assumes that with respect to the conveyance device 1 illustrated in FIG. 1, an upper frame 11 side corresponds to an upward direction, a travelling carriage 20 side corresponds to a downward direction, a side on which a support pillar 10A is disposed corresponds to a leftward direction, and a side on which a support pillar 10B is disposed corresponds to a rightward direction.

[Outline of Conveying Device]

Conventionally, it has been known that in various machines, linear guide rails and linear guide blocks engaging with the linear guide rails are used as mechanisms that achieve smooth linear movement. As a specific configuration of a linear guide rail and a linear guide block, for example, the international publication WO00/29160 discloses a configuration in which a linear-motion ball bearing of a ball recirculation type is incorporated into a linear guide block, and a surface on which balls of the linear-motion ball bearing roll is provided to a linear guide rail. The linear guide block linearly moves along the linear guide rail with the balls rolling along the surface.

The mechanism as above is used also for a conveyance device configured to convey an article by raising and lowering an elevator section thereof which is loaded with the article, along a support pillar. For example, in the conveyance device, the support pillar is provided with a linear guide rail, and a linear guide block engaging with the linear guide rail is disposed in the elevator section, thereby achieving smooth raising and lowering of the elevator section of the conveyance device.

In a case where a linear guide rail and a linear guide block which are used for a conveyance device have the configuration disclosed in the international publication WO00/29160, filling, with grease, a space in which the linear-motion ball bearing is incorporated enables the linear guide block to more smoothly move with respect to the linear guide rail, thereby enabling the elevator section to be more smoothly raised and lowered along the support pillar.

Therefore, in order to maintain the smoother raising and lowering of the elevator section, the linear guide block necessitates maintenance of injecting grease as appropriate so as not to run out of grease.

However, in a case where the elevator section is provided with a frame which is interposed between a body part thereof on which a conveyance target is to be placed and the linear guide block and which fixes the body part and the linear guide block, it is impossible to access the linear guide block from an elevator section side. Therefore, in order to inject grease into the linear guide block, processes of, for example, providing the support pillar with an opening that allows the access to the linear guide block are necessary. In many cases, a lower part of the support pillar is provided with control devices and the like. Thus, in order to avoid them, the opening is inevitably provided at a high position above the floor surface in a case where the opening is provided to the support pillar. In this case, the operation of injecting the grease needs to be performed at a high position above the floor surface, resulting in poor workability.

FIG. 1 is a perspective view illustrating a conveyance device 1 in accordance with an embodiment of the present invention. As illustrated in FIG. 1, the conveyance device 1 conveys an article with the article loaded to an elevator section 30 configured to be raised and lowered along support pillars 10. In the conveyance device 1, the support pillars 10 are provided with linear guide rails 12, and the elevator section 30 is provided with linear guide blocks 34 which engage with the linear guide rails 12 such that the linear guide blocks 34 are linearly movable. Thus, the linear guide blocks 34 move while engaging with the linear guide rails 12, so that the elevator section 30 is raised and lowered along the support pillars 10 while being guided by the linear guide rails 12.

Figure 2:
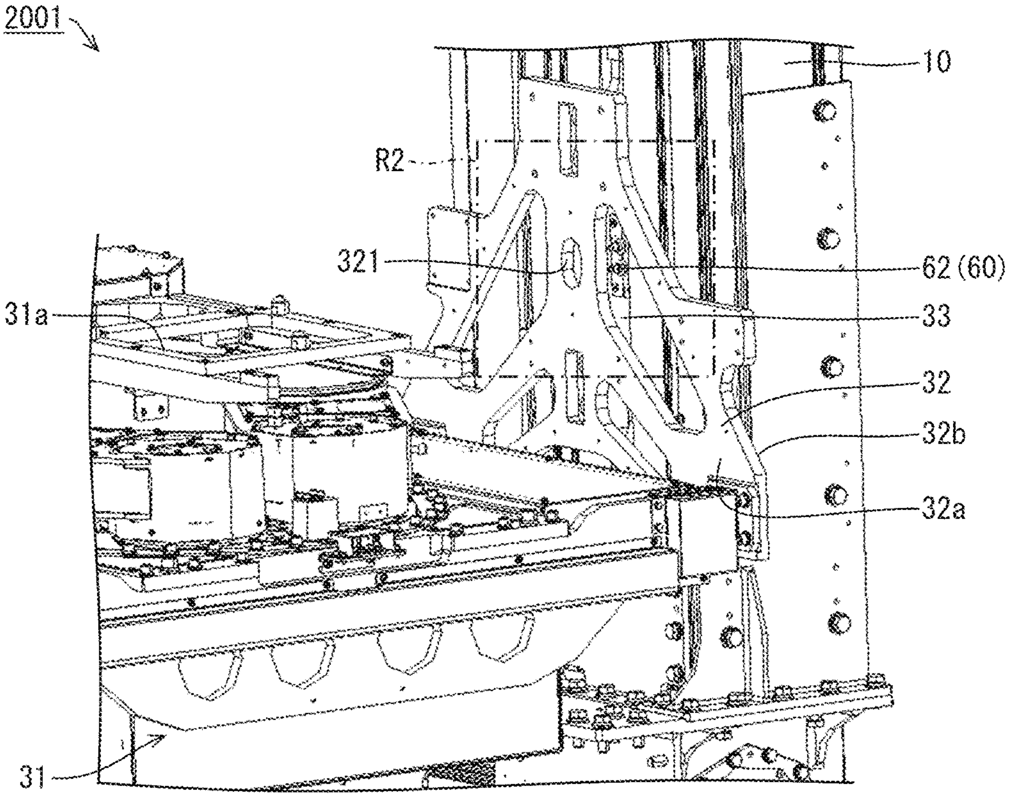
FIG. 2 is an enlarged view illustrating a part of the conveyance device.
Figure 2:
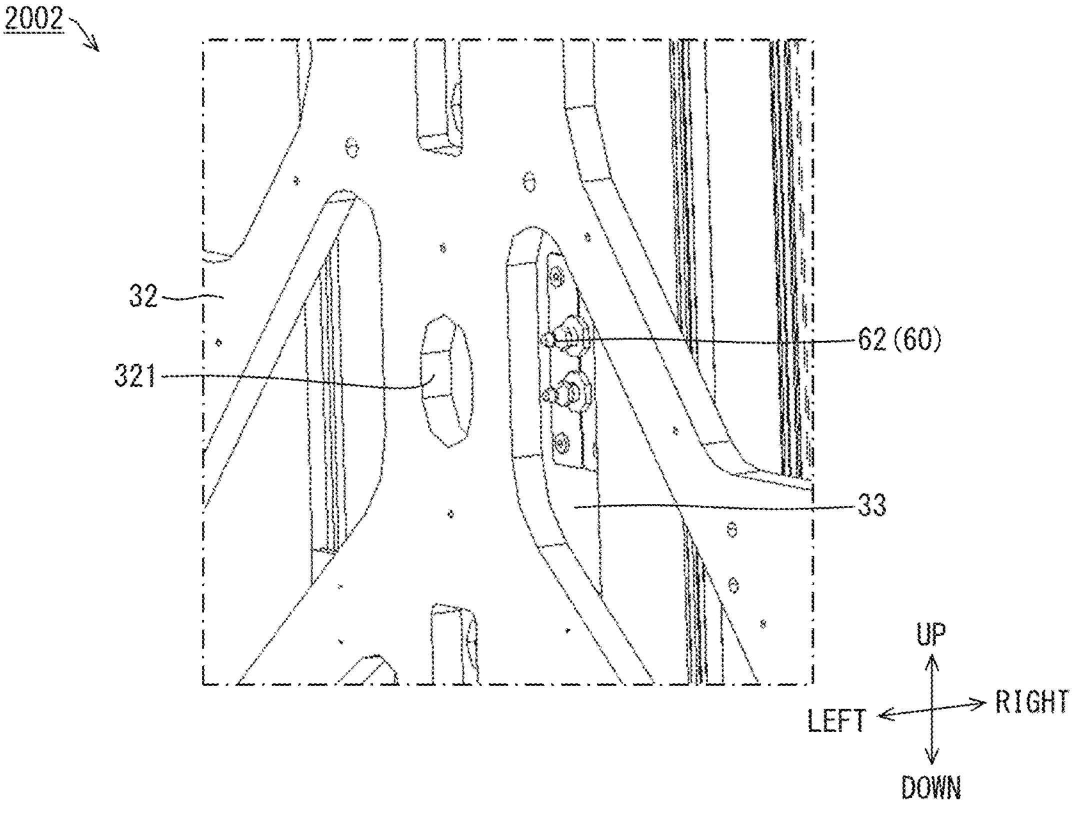

In the present embodiment, in order to solve the foregoing problem in the conveyance device 1 as described above, the elevator section 30 is provided with injection sections 60 that enable grease which is to be supplied to the linear guide blocks 34 to be injected from a position spaced from the linear guide blocks 34, as illustrated in FIG. 2. FIG. 2 is an enlarged view illustrating a part of the conveyance device 1. More specifically, the reference numeral 2001 of FIG. 2 indicates an enlarged view of a range R1 of FIG. 1, and the reference numeral 2002 of FIG. 2 indicates a further enlarged view illustrating a range R2 indicated by the reference numeral 2001 of FIG. 2.

The above configuration enables grease to be injected into the linear guide blocks 34 without the need for performing, for the support pillars 10, processes for access to the linear guide blocks 34. As a result, it is possible to achieve the conveyance device 1 that enables grease to be easily injected into the linear guide blocks 34.

The conveyance device 1 to which an embodiment of the present invention is applied only needs to be a device configured to convey a conveyance target in an up-and-down direction. Examples of such a conveyance device 1 to which an embodiment of the present invention can be applied include stacker cranes including travelling carriages, lifters having no travelling functions, and stockers having functions of conveying conveyance targets as accommodated articles in an up-and-down direction.

(Conveyance Device)

As illustrated in FIG. 1, the conveyance device 1 includes the support pillars 10, a travelling carriage 20, and the elevator section 30. The support pillars 10 are columnar members extending in an up-and-down direction. The conveyance device 1 is provided with the two support pillars 10 paired with each other. The support pillars 10 are not limited to the above configuration, and only one support pillar 10 may be provided. In the following descriptions, among the two support pillars 10 paired, one support pillar 10 may be referred to as "support pillar 10A", and the other support pillar 10 may be referred to as "support pillar 10B". The support pillar 10A and the support pillar 10B are spaced from each other in a left-and-right direction. Between the support pillar 10A and the support pillar 10B, the elevator section 30 described later is disposed.

On the support pillars 10, an upper frame 11 is provided. The upper frame 11 is provided so as to connect the upper end part of the support pillar 10A and the upper end part of the support pillar 10B. For example, the upper frame 11 engages with an upper guide rail (not illustrated) and guides the conveyance device 1 in a left-and-right direction described in the drawings with use of the upper guide rail. Note that the upper guide rail may not be provided. For example, the conveyance device 1 may not move in a left-and-right direction and may have only a function of conveying a conveyance target in an up-and-down direction. In this case, the upper guide rail and the travelling carriage 20 described later may not be provided.

The linear guide rails 12 are provided to the respective support pillars 10A and 10B. The linear guide rails 12 guide the movement in an up-and-down direction of the elevator section 30. The linear guide rails 12 are members linearly extending in an up-and-down direction. The linear guide rails 12 are provided inside the support pillars 10 so as to be exposed on an elevator section 30 side in the support pillars 10. The shape of the linear guide rail 12 is not particularly limited. For example, the cross section along a plane which is perpendicular to an up-and-down direction and which is parallel to a left-and-right direction may have a substantially circular shape or may have a substantially I-shape.

Raising and lowering motor units 15 which are driving sections configured to raise and lower the elevator section 30 with respect to the support pillars 10 are provided beneath the support pillars 10. The support pillar 10A and the support pillar 10B are provided with a raising and lowering motor unit 15A and a raising and lowering motor unit 15B, respectively. The raising and lowering motor units 15 have raising and lowering motors (not illustrated) configured to drive driving drums (not illustrated) provided beneath the support pillars 10.

For example, the raising and lowering motors drive the driving drums. Around each of the driving drums, a raising and lowering belt (not illustrated) having an end fixed to the elevator section 30 is wound. In an upper part of each of the support pillars 10, the raising and lowering belt is secured by a pulley (not illustrated) provided to the support pillar 10. The pulley rotates in accordance with advance and retreat of the raising and lowering belt. Positive or negative rotation of the raising and lowering motor causes the raising and lowering belt to advance or retreat. This causes the elevator section 30 to move (be raised and lowered) in an up-and-down direction along the support pillars 10. Note that the above configuration of the raising and lowering motor, the raising and lowering belt, and the pulley is one example of a mechanism configured to raise and lower the elevator section 30.

The travelling carriage 20 includes a carriage frame 21 and a travelling motor unit 25. The travelling carriage 20 is one example of a travelling section. The carriage frame 21 is provided with the support pillars 10 standing thereon and with wheels 22.

The carriage frame 21 is provided with the travelling motor unit 25 which is a driving section configured to cause the conveyance device 1 to travel. The travelling motor unit

25 has a travelling motor (not illustrated). A driving force from the travelling motor is transmitted to the wheels 22 to cause the wheels 22 to rotate. When the wheels 22 rotate, the conveyance device 1 is, for example, guided by a travelling guide rail disposed so as to extend in a left-and-right direction, to travel in a left-and-right direction.

(Elevator Section)

The elevator section 30 can be loaded with a conveyance target. The elevator section 30 is raised and lowered along the support pillars 10. The elevator section 30 is disposed between the two support pillars 10A and 10B and moves upward and downward while being guided by a linear guide rail 12A and a linear guide rail 12B which are provided to the support pillar 10A and the support pillar 10B, respectively. This enables the elevator section 30 to be stably raised and lowered.

Figure 3:
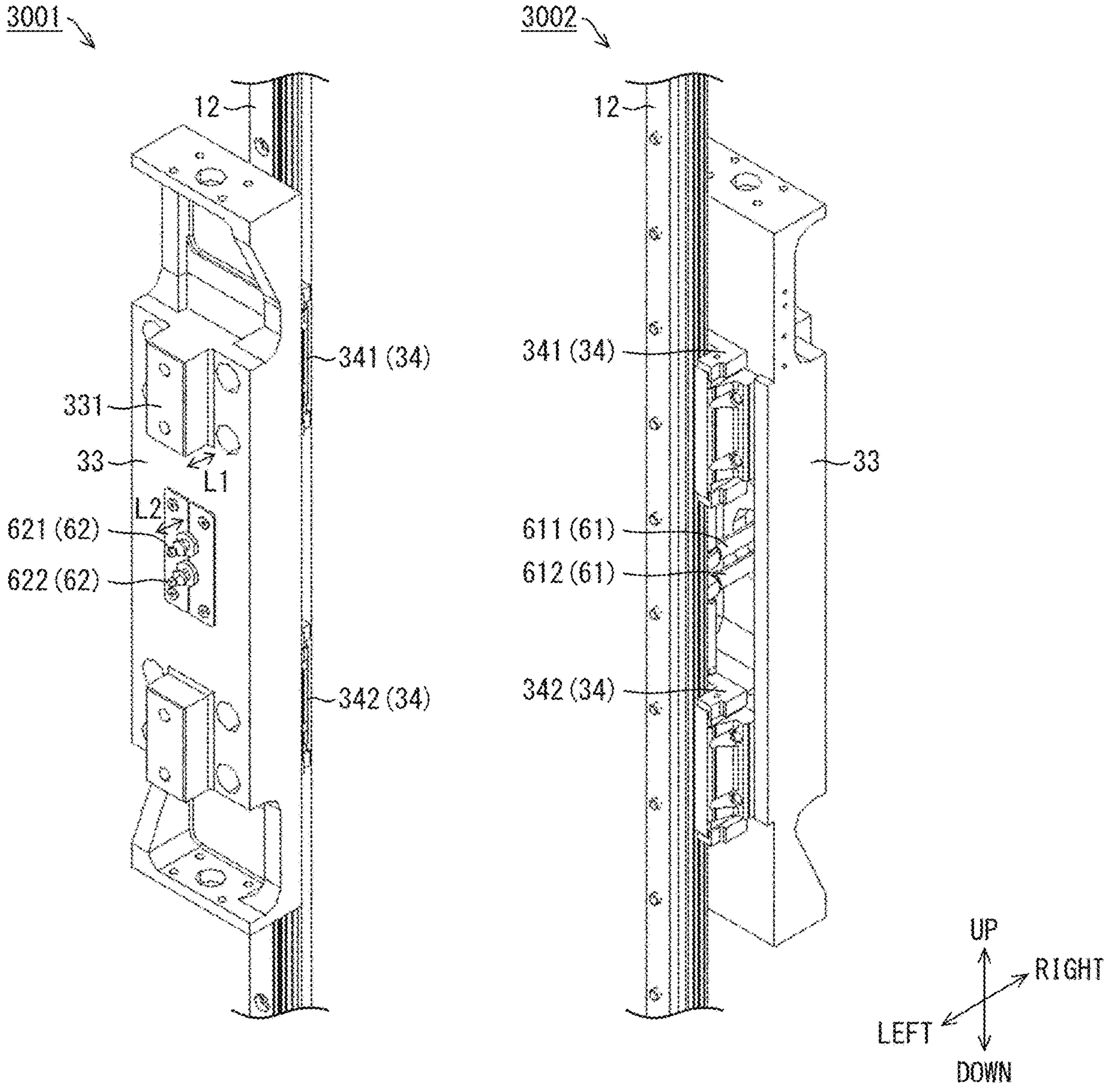
FIG. 3 is a perspective view illustrating a configuration of an elevator section from which a body part and a first frame are removed.
Figure 4:
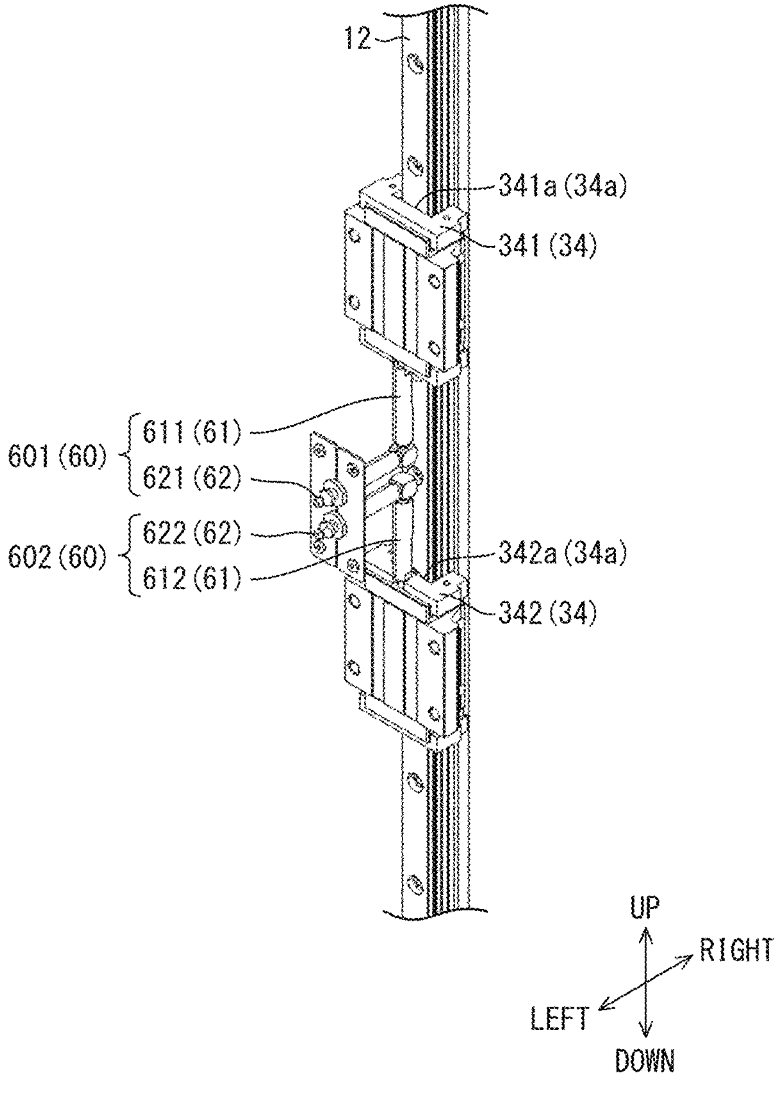
FIG. 4 is a perspective view illustrating a configuration indicated in the reference numeral 3001 of FIG. 3 from which a second frame is removed.

The elevator section 30 includes a body part 31, first frames 32, second frames 33, the linear guide blocks 34, and the injection sections 60. The first frames 32, the second frames 33, the linear guide blocks 34, and the injection sections 60 are installed substantially symmetrically with respect to the body part 31 on both sides in a left-and-right direction of the body part 31. Further, the first frames 32, the second frames 33, the linear guide blocks 34, and the injection sections 60 each have the same configuration on either a support pillar 10A side or a support pillar 10B side. Therefore, FIGS. 2 to 4 illustrate the linear guide rail 12 and the above configurations without identifying on which of the support pillar 10A side or the support pillar 10B side the linear guide rail 12 and the above configurations are installed.

The body part 31 is configured to be loaded with a conveyance target. As illustrated in the reference numeral 2001 of FIG. 2, the body part 31 has a placement surface 31*a* on which the conveyance target can be placed. Placing the conveyance target on the placement surface 31*a* allows the conveyance target to be loaded to the body part 31. In the elevator section 30, for example, the conveyance target can be transferred between the body part 31 and a load shelf.

The first frames 32 are installed on both sides in a left-and-right direction of the body part 31 and fix the body part 31 to the second frames 33 on the both sides in a left-and-right direction of the body part 31. Each of the first frames 32 is a plate-like member and is disposed substantially parallel to an up-and-down direction and substantially perpendicular to a left-and-right direction. The first frame 32 has a front surface 32*a* located opposite to a linear guide rail 12 side. To the front surface 32*a*, the body part 31 is fixed. The first frame 32 has a back surface 32*b* located on the linear guide rail 12 side. On the back surface 32*b*, the first frame 32 is fixed to the corresponding one of the second frames 33.

Each of the first frames 32 is provided with an opening 321. As indicated in the reference numeral 2002 of FIG. 2, the opening 321 penetrates through the first frame 32 from a body part 31 side to a linear guide rail 12 side in a thickness direction of the first frame 32. In the first frame 32, the opening 321 is provided at a position corresponding to injection inlets 62 of the injection sections 60 described later. The size of the opening 321 is not particularly limited. However, it is desirable that the opening 321 has a size that at least can encompass the two injection inlets 62 (an injection inlet 621 and an injection inlet 622) described later.

This enables a maintenance staff of the conveyance device 1 to easily access the injection sections 60 from a body part 31 side and thus makes it possible to inject grease into the linear guide blocks 34 without performing processes on the support pillars 10.

FIG. 3 is a perspective view illustrating a configuration of the elevator section 30 from which the body part 31 and the first frames 32 are removed. For easier understanding, FIG. 3 does not illustrate the support pillars 10 and illustrates only the linear guide rails 12. The reference numeral 3001 of FIG. 3 indicates a perspective view illustrating the above configuration as viewed from a body part 31 side. The reference numeral 3002 of FIG. 3 indicates a perspective view illustrating the above configuration as viewed from a side opposite to the view indicated by the reference numeral 3001 of FIG. 3.

As illustrated in FIG. 2 and FIG. 3, the second frame 33 is disposed between the first frame 32 and the linear guide block 34 and fixes the first frame 32 and the linear guide block 34. As indicated in the reference numeral 3001 of FIG. 3, the second frame 33 has, at an upper part thereof and a lower part thereof on the surface on a body part 31 side, fixation parts 331 protruding from a linear guide rail 12 side to a body part 31 side. The second frame 33 fixes the first frame 32 to the second frame 33 with use of the fixation parts 331.

On the surface on a body part 31 side of the second frame 33, the injection inlets 62 described later are provided. For example, setting a length L1 in a left-and-right direction of the fixation part 331 to be longer than a length L2 in a left-and-right direction of the injection inlet 62 enables, on a body part 31 side of the second frame 33, the first frame 32 to be easily fixed to the second frame 33 with the injection inlets 62 provided.

Further, each of the first frames 32 is provided with the opening 321, as described above. This makes it possible to access the injection inlets 62 without the need for processes on the support pillars 10, even when the first frame 32 is interposed between the injection inlets 62 and the body part 31.

In the elevator section 30, the body part 31 and the first frames 32 are disposed outside the support pillars 10, and the second frames 33 and the linear guide blocks 34 are disposed inside the support pillars 10 together with the linear guide rails 12. The linear guide rails 12 are provided so as to be exposed on an elevator section 30 side in the support pillars 10. Thus, even when the second frames 33 and the linear guide blocks 34 are disposed inside the support pillars 10, the elevator section 30 can be raised and lowered along the support pillars 10.

(Linear Guide Block)

The linear guide blocks 34 engage with the linear guide rails 12 such that the linear guide blocks 34 are linearly movable. For example, by the second frames 33 fixed to the raising and lowering belts advancing and retreating with use of the raising and lowering belts, the linear guide blocks 34 slide with respect to the linear guide rails 12.

FIG. 4 is a perspective view illustrating a configuration indicated in the reference numeral 3001 of FIG. 3 from which the second frame 33 is removed. As illustrated in FIG. 3 and FIG. 4, the linear guide blocks 34 are included in the elevator section 30 such that two linear guide blocks 34 are disposed in one linear guide rail 12 so as to be arranged side by side in an up-and-down direction. In the following descriptions, the upper linear guide block 34 may be referred to as "linear guide block 341" and the lower linear guide block 34 may be referred to as "linear guide block 342".

On a surface on a linear guide rail 12 side of each of the linear guide blocks 34, a recess 34*a* recessed from a linear guide rail 12 side toward a body part 31 side is formed along an up-and-down direction. The recess 34*a* is formed in the linear guide block 34 so as to engage with the linear guide rail 12 such that the linear guide blocks 34 are movable in an up-and-down direction. The linear guide block 341 and the linear guide block 342 are provided with a recess 341*a* (34*a*) and a recess 342*a* (34*a*), respectively.

Therefore, for example, when moving in an up-and-down direction with use of the raising and lowering belts, the linear guide blocks 34 are guided by the linear guide rails 12, thereby enabling the body part 31 to stably move in an up-and-down direction in accordance with the movement of the raising and lowering belts.

Note that the configuration for causing the linear guide blocks 34 to smoothly slide along the linear guide rails 12 is not particularly limited. For example, the configuration disclosed in the above-described international publication WO00/29160 may be employed.

(Injection Section)

The injection sections 60 enable grease which is to be supplied to the linear guide blocks 34 to be injected from a position spaced from the linear guide blocks 34. Therefore, the conveyance device 1 enables, with the injection sections 60, grease to be easily injected into the linear guide blocks 34 without accessing the linear guide blocks 34.

Each of the injection sections 60 is constituted by (i) pipe members 61 connected to the corresponding linear guide blocks 34 and (ii) injection inlets 62. The pipe members 61 are provided with the injection inlets 62 disposed at terminal ends thereof and connect the injection inlets 62 and the linear guide blocks 34. Therefore, for example, injecting grease into the pipe members 61 from the injection inlets 62 allows grease to be reliably injected into the linear guide blocks 34. It is desirable that the material of the pipe members 61 is metal.

To the linear guide block 341 and the linear guide block 342, an injection section 601 and an injection section 602 are connected, respectively. The injection section 601 and the injection section 602 have the same configuration. The injection section 601 has a pipe member 611 and an injection inlet 621, and the injection section 602 has a pipe member 612 and an injection inlet 622.

The pipe member 611 is connected to the lower surface of the linear guide block 341. The pipe member 611 extends downward along the linear guide rail 12 at a predetermined distance and then extends substantially parallel to a left-and-right direction toward a body part 31 side. The starting end on a linear guide block 341 side of the pipe member 611 is, for example, connected to the lower surface of the linear guide block 341 so as to allow the grease which has injected into the pipe member 611 to be injected into a space in which the linear-motion ball bearing is incorporated.

The terminal end of the pipe member 611, which is the end that is not connected to the linear guide block 341, is provided with, on a surface on a body part 31 side of the second frame 33, the injection inlet 621 (injection inlet 62) facing toward a body part 31 side. In other words, the grease injection inlet 621 (injection inlet 62) of the injection section 601 (injection section 60) faces in a direction away from the linear guide rail 12.

Because the grease injection inlet 621 faces in a direction away from the linear guide rail 12, the linear guide rail 12 does not hinder grease from being injected into the injection section 601. Further, the fact that the injection inlet 621 is provided at the terminal end of the pipe member 611 makes it easy to inject grease into the pipe member 611.

To the injection inlet 621, a lid configured to open when a nozzle is pushed into the lid may be attached. This allows the injection inlet 621 to open only when grease is injected and thus can prevent a foreign matter from entering the injection section 601.

The pipe member 612 is connected to the upper surface of the linear guide block 342. The pipe member 612 extends upward along the linear guide rail 12 at a predetermined distance and then extends substantially parallel to a left-and-right direction toward a body part 31 side. The starting end on a linear guide block 342 side of the pipe member 612 is connected to the upper surface of the linear guide block 342. The terminal end of the pipe member 612, which is the end that is not connected to the linear guide block 342, is provided with, on a surface on a body part 31 side of the second frame 33, the injection inlet 622 facing toward a body part 31 side. In other words, the grease injection inlet 622 of the injection section 602 faces in a direction away from the linear guide rail 12.

Further, because the injection inlets 62 are included in the elevator section 30, grease can be injected from a place in which the elevator section 30 is positioned. Therefore, grease can be injected after the elevator section 30 has been moved to a position that allows for easier work, thereby leading to improved workability of maintenance.

Note that when the grease is injected into the linear guide blocks 34, the excess grease including old grease remaining the linear guide blocks 34 is discharged from the linear guide blocks 34 and is, for example, guided to a lower part of the support pillars 10 to be discharged to the outside of the support pillars 10.

Figure 5:
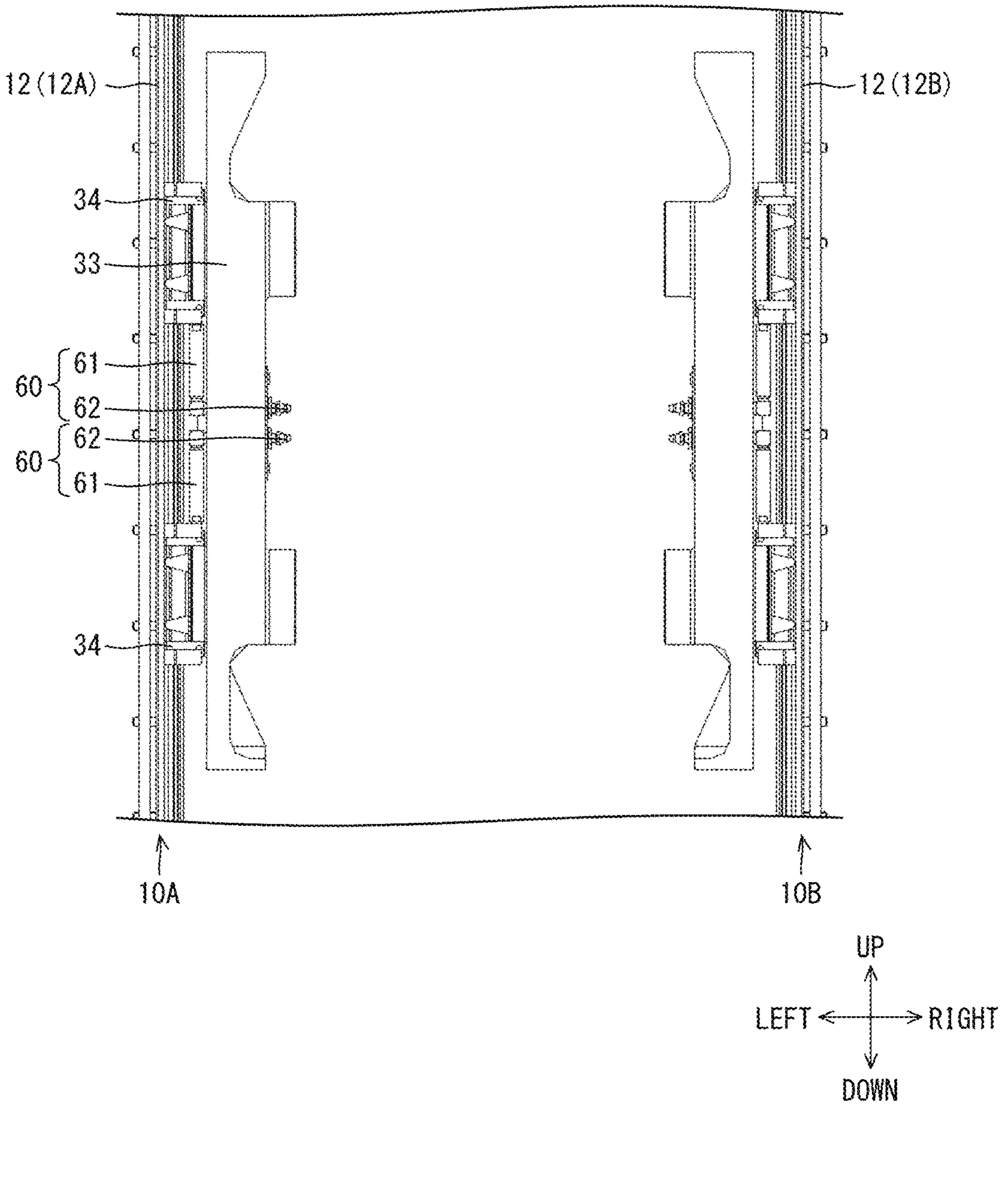
FIG. 5 is a view illustrating the elevator section from which the body part and the first frame are removed and a pair of linear guide rails, in part of the conveyance device.

FIG. 5 is a view illustrating the elevator section 30 from which the body part 31 and the first frames 32 are removed and the pair of linear guide rails 12, in part of the conveyance device 1. The second frame 33, the linear guide blocks 34, and the injection sections 60 which are installed to the linear guide rail 12A are similarly installed to the linear guide rail 12B.

As illustrated in FIG. 5, the injection inlets 62 which allow grease to be injected into the linear guide blocks 34 that engage with the linear guide rail 12A face in a direction from the linear guide rail 12A toward the linear guide rail 12B. In other words, the injection inlets 62 face in a direction from the one support pillar 10A toward the other support pillar 10B. In addition, the injection inlets 62 which allow grease to be injected into the linear guide blocks 34 that engage with the linear guide rail 12B face in a direction from the linear guide rail 12B toward the linear guide rail 12A.

Therefore, grease can be injected from between the support pillar 10A and the support pillar 10B into both the linear guide blocks 34 that engage with the linear guide rail 12A of the support pillar 10A and the linear guide blocks 34 that engage with the linear guide rail 12B of the support pillar 10B. This improves workability of maintenance.

Aspects of the present invention can also be expressed as follows:

A conveyance device (1) in accordance with Aspect 1 of the present invention includes: a support pillar (10); and an elevator section (30) which is able to be loaded with a conveyance target and which is configured to be raised and lowered along the support pillar (10), the support pillar (10) being provided with a linear guide rail (12), the elevator section (30) being provided with: a linear guide block (34) which engages with the linear guide rail (12) such that the linear guide block (34) is linearly movable; and an injection section (60) that enables grease which is to be supplied to the linear guide block (34) to be injected from a position spaced from the linear guide block (34).

According to the above configuration, the elevator section is raised and lowered along the support pillar with use of the linear guide block which, such that the linear guide block is linearly movable, engages with the linear guide rail provided to the support pillar. Supplying grease into the linear guide block enables the linear guide block engaging with the linear guide rail to smoothly move with respect to the linear guide rail. This enables the elevator section to be smoothly raised and lowered along the support pillar.

Further, the elevator section is provided with the injection section that allows grease which is to be supplied to the linear guide block to be injected from a position spaced from the linear guide block. This enables grease to be supplied into the linear guide block without the need for access to the linear guide block, such as direct injection of grease into the linear guide block.

Furthermore, grease can be injected from a place in which the elevator section is positioned, and thus grease can be injected after the elevator section has been moved to a position that allows for easier work. As a result, it is possible to achieve a conveyance device that enables grease to be easily supplied to the linear guide block.

A conveyance device (1) in accordance with Aspect 2 of the present invention may be configured, in Aspect 1, such that: the injection section (60) includes an injection inlet (62) for the grease; and the injection inlet (62) faces in a direction away from the linear guide rail (12).

According to the above configuration, the grease injection inlet faces in a direction away from the linear guide rail, and thus the linear guide rail does not hinder the grease from being injected. Thus, it is possible to easily inject grease into the linear guide block.

A conveyance device (1) in accordance with Aspect 3 of the present invention may be configured, in Aspect 2, such that the support pillar (10) includes two support pillars (10); the elevator section (30) is disposed between the two support pillars (10); and the injection inlet (62) faces in a direction from one of the two support pillars (10) toward the other one of the two support pillars (10).

According to the above configuration, the elevator section is disposed between the two support pillars and thus can be stably raised and lowered. Further, the injection inlet faces in a direction from one of the support pillars toward the other one of the support pillars, and thus grease can be injected from between the two support pillars into the both linear guide blocks engaging with the respective linear guide rails provided to the two support pillars. Therefore, the work effectiveness is improved.

A conveyance device (1) in accordance with Aspect 4 of the present invention may be configured, in any one of Aspects 1 to 3, such that the injection section (60) is constituted by a pipe member (61) connected to the linear guide block (34).

According to the above configuration, the injection section is constituted by a pipe member connected to the linear guide block, and thus, for example, injecting grease into the pipe member of the injection section enables the grease to be easily and reliably injected into the linear guide block.

A conveyance device (1) in accordance with Aspect 5 of the present invention may be configured, in Aspect 4, such that a terminal end of the pipe member (61) is provided with an injection inlet (62) for the grease.

According to the above configuration, the terminal end of the pipe member is provided with the grease injection inlet, and thus the configuration makes it easy to inject grease into the pipe member.

The present invention is not limited to the embodiments above, and can be altered by a skilled person in the art within the scope of the claims. The present invention also encompasses, in its technical scope, any embodiment derived by combining technical means disclosed in the embodiments as appropriate. Furthermore, the technical means disclosed in different embodiments can be combined to form a novel technical feature.

REFERENCE SIGNS LIST

1 Conveyance device
10, 10A, 10B Support pillar
11 Upper frame
12, 12A, 12B Linear guide rail
30 Elevator section
34, 341, 342 Linear guide block
60, 601, 602 Injection section
62, 621, 622 Injection inlet
61, 611, 612 Pipe member

The invention claimed is:

1. A conveyance device comprising:
a support pillar; and
an elevator section which is able to be loaded with a conveyance target and which is configured to be raised and lowered along the support pillar,
the support pillar being provided with a linear guide rail,
the elevator section being provided with:
a pair of vertically aligned linear guide blocks which engage with the linear guide rail such that the linear guide blocks are linearly movable; and
an injection section disposed between the pair of vertically aligned linear guide blocks that enables grease which is to be supplied to the linear guide blocks to be injected from a position spaced from the linear guide block.

2. The conveyance device according to claim 1, wherein:
the injection section includes an injection inlet for the grease; and
the injection inlet faces in a direction away from the linear guide rail.

3. The conveyance device according to claim 1, wherein the injection section is constituted by a pipe member connected to the linear guide block.

4. The conveyance device according to claim 3, wherein a terminal end of the pipe member is provided with an injection inlet for the grease.

5. The conveyance device according to claim 1, wherein the elevator section includes a first frame and a second frame and the injection section is accessible via an opening in the first frame.

6. A conveyance device comprising:
a support pillar which is provided with a linear guide rail;
an elevator section which is able to be loaded with a conveyance target, and configured to be raised and lowered along the support pillar, the elevator section comprising (i) a pair of vertically aligned linear guide blocks which engage with the linear guide rail such that the linear guide blocks are linearly movable, (ii) a body part which is configured to be loaded with the conveyance target, (iii) frames which are provided between the body part and the linear guide block, and fix the body part to the linear guide block; and (iv) an injection section that enables grease which is to be supplied to the linear guide blocks to be injected from a position spaced from the linear guide blocks, the frames having an opening through which the injection section is accessible.

7. The conveyance device according to claim 6, wherein:

the support pillar comprises two support pillars;

the elevator section is disposed between the two support pillars; and the injection inlet faces in a direction from one of the two support pillars toward the other one of the two support pillars.

8. The conveyance device according to claim 7, wherein:

the frames comprise a first frame and a second frame, the first frame is provided between the body part and the two support pillars;

the second frame is provided between the first frame and the linear guide block;

the injection section is disposed on a surface of the second frame, the surface facing the main body part; and the opening extends through the first frame in a thickness direction of the first frame from a side of the body part to a side of the support pillar.

9. The conveyance device according to claim 8, wherein the injection section is constituted by a pipe member connected to the linear guide block.

10. The conveyance device according to claim 9, wherein the injection inlet faces the opening in the thickness direction of the first frame.

11. The conveyance device according to claim 9, wherein:

the second frame comprises, on its surface on the side of the body part, a fixation part protruding from a side of the linear guide rail toward the side of the body part; and on the surface of the body part of the second frame, a length (L1) of the fixation part in the thickness direction of the first frame is longer than a length (L2) of the injection section in the thickness direction of the first frame.

12. The conveyance device according to claim 8, wherein:

the body part and the first frame are disposed outside the support pillars; and the second frame and the linear guide block are disposed inside the support pillars.

13. The conveyance device according to claim 7, wherein:

the linear guide block is provided with a recess on a surface on a side of the linear guide rail, the recess being recessed from the side of the linear guide rail toward a side of the body part and extending along the support pillar; and the recess engages with the linear guide rail.

14. The conveyance device according to claim 13, wherein:

the linear guide block incorporates a linear-motion ball bearing, and the linear guide block and the linear guide rail engage with each other with balls of the linear-motion ball bearing interposed in the recess.

15. A conveyance device comprising:

a support pillar; and an elevator section which is able to be loaded with a conveyance target and which is configured to be raised and lowered along the support pillar, the support pillar being provided with a linear guide rail, the elevator section being provided with:

a pair of vertically aligned linear guide blocks which engage with the linear guide rail such that the linear guide blocks are linearly movable; and an injection section that enables grease which is to be supplied to the linear guide blocks to be injected from a position disposed between the pair of vertically aligned linear guide blocks, wherein:

the support pillar comprises two support pillars, the elevator section is disposed between the two support pillars, and the injection inlet faces in a direction from one of the two support pillars toward the other one of the two support pillars.

* * * * *